United States Patent
Suda

(10) Patent No.: US 6,358,488 B1
(45) Date of Patent: Mar. 19, 2002

(54) METHOD FOR GENERATION OF HYDROGEN GAS

(76) Inventor: Seijirau Suda, 1-48, Tsujido-taiheidai 2-chome, Fujisawa-shi, Kanagawa-ken (JP)

( * ) Notice: Subject to any disclaimer, the term of this patent is extended or adjusted under 35 U.S.C. 154(b) by 47 days.

(21) Appl. No.: 09/610,363

(22) Filed: Jul. 5, 2000

(30) Foreign Application Priority Data

Jul. 5, 1999  (JP) ............................................. 11-190208

(51) Int. Cl.$^7$ ............................................. C01B 3/08

(52) U.S. Cl. .................. 423/657; 423/648.1; 423/658.2

(58) Field of Search ............................. 423/648.1, 657, 423/658.2

(56) References Cited

U.S. PATENT DOCUMENTS 3,253,884 A * 5/1966 Jung et al. ............... 423/648.1

* cited by examiner

Primary Examiner—Steven P. Griffin
Assistant Examiner—Maribel Medina
(74) Attorney, Agent, or Firm—Wenderoth, Lind & Ponack, LLP

(57) ABSTRACT

Disclosed is a handy and efficient method for generation of hydrogen gas, in which a reaction medium prepared by dissolving a metal hydrogen complex compound such as sodium borohydride $NaBH_4$ in an aqueous alkaline solution such as a 10% by weight aqueous solution of sodium or potassium hydroxide is brought into contact with a catalyst which is a metal such as cobalt and nickel or a so-called hydrogen-absorbing alloy such as $Mg_2Ni$ so that decomposition of the metal hydrogen complex compound proceeds even at room temperature to generate hydrogen gas. The catalytic activity of the catalyst can be increased by subjecting the catalyst to a fluorinating treatment in which the catalyst powder is immersed in an aqueous solution of potassium fluoride acidified with hydrofluoric acid.

10 Claims, 3 Drawing Sheets

METHOD FOR GENERATION OF HYDROGEN GAS

BACKGROUND OF THE INVENTION

The present invention relates to a novel system of hydrogen-gas generation and a method for generation of hydrogen gas by using the same in an industrially feasible scale.

As is well known, various industrial methods are practiced for the generation of hydrogen gas in an industrially feasible scale including the method of electrolysis of water, reaction of a metal with an acid, reaction of certain metals with a strongly alkaline compound, reaction of calcium hydride with water, steam reforming of methyl alcohol or methane in natural gas, releasing of hydrogen gas from a hydrogen-loaded hydrogen-absorbing metal or alloy, and so on. When a carborne hydrogen supply source is desired, however, these prior art hydrogen-generating means are each not suitable for the purpose of hydrogen supply to fuel cells which must naturally be very compact in size and light in weight. For example, some of these hydrogen-generating means can be operated only with consumption of a large quantity of energy. The yield of hydrogen gas is sometimes not high enough relative to the amount of the source material consumed. The efficiency of the process also cannot be high enough unless the apparatus or instrument therefor is quite large.

On the other hand, it is also known that hydrogen gas is evolved when a metal hydrogen complex compound such as lithium aluminum hydride $LiAlH_4$ or sodium borohydride $NaBH_4$, which is used as a hydrogenation reagent in laboratories, is brought into contact with water sometimes resulting in eventual hazardous explosion due to evolution of a large volume of hydrogen gas at a time requiring utmost care.

Thus, it is eagerly desired to develop a method and a source material for hydrogen gas generation by which the rate of hydrogen gas generation can be easily controlled with full safety.

SUMMARY OF THE INVENTION

The present invention accordingly has an object to provide a novel and improved efficient method for the generation of hydrogen gas and a system or agent therefor by which hydrogen gas can be generated efficiently in a high yield at a readily controllable rate without any danger of explosion.

Thus, the method of the present invention for the generation of hydrogen gas, which has been established as a result of the extensive investigations undertaken by the inventor with the above mentioned object, comprises the steps of:

(a) dissolving, in an aqueous alkaline medium, a metal hydrogen complex compound of a composition represented by the general formula

(I)

or

(II)

in which $M^I$ is an alkali metal, $M^{II}$ is an alkaline earth metal or zinc, $M^{III}$ is an element selected from the group consisting of boron, aluminum and gallium, R is an alkoxy group, aryloxy group or acyloxy group and the subscript n is 0, 1, 2 or 3, to give a solution as a reaction medium; and (b) contacting the reaction medium, with a fluorinated or unfluorinated metal or hydrogen-absorbing alloy having catalytic activity for the decomposition reaction of the metal hydrogen complex compound in the reaction medium.

Accordingly, the hydrogen-generating system of the invention comprises:

(A) an aqueous alkaline solution as a medium;

(B) a metal hydrogen complex compound of a composition represented by the general formula

(I)

or

(II)

in which each symbol has the same meaning as defined above, dissolved in the aqueous alkaline solution to form a reaction medium; and (C) a fluorinated or unfluorinated metal or hydrogen-absorbing alloy having catalytic activity in contact with the reaction medium.

DETAILED DESCRIPTION OF THE PREFERRED EMBODIMENTS

Figure 1:
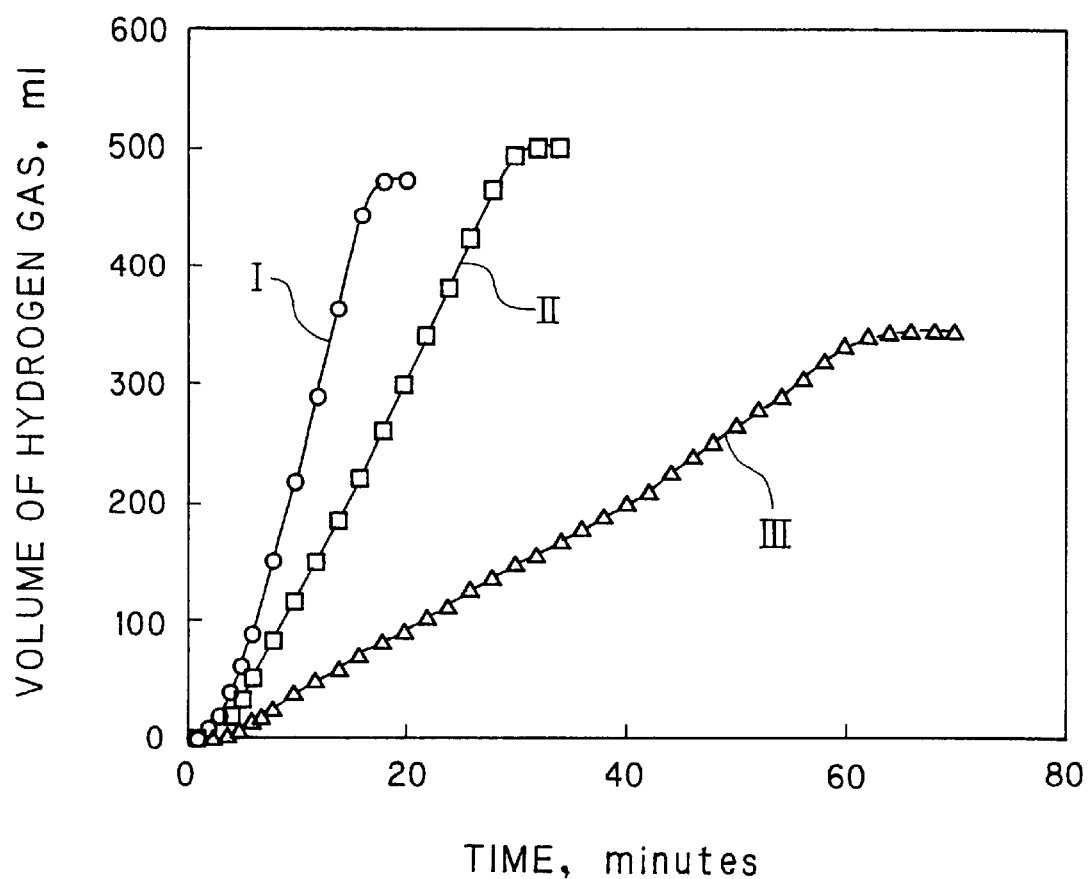
FIGS. 1, 2 and 3 are each a graph showing the volume of generated hydrogen gas as a function of time lapsed in Examples 1, 2 and 3, respectively.

As is understood from the above given summarizing description, the hydrogen source material in the inventive method or system for hydrogen gas generation is a metal hydrogen complex compound having a chemical composition represented by the general formula (I) or (II). In these formulas, $M^I$ is an alkali metal element including lithium, sodium, potassium and rubidium, $M^{II}$ is an alkaline earth metal element including magnesium, calcium and strontium or zinc and $M^{III}$ is an element belonging to the Group 3B of the Periodic Table including boron, aluminum and gallium. The group denoted by R in these general formulas, on the other hand, is an alkoxy group such as methoxy, ethoxy, n-propoxy, isopropoxy, n-butoxy, isobutoxy, sec-butoxy, tert-butoxy, 2-methoxyethoxy and ethoxymethoxy groups, an aryloxy group such as phenoxy group or an acyloxy group such as acetoxy and propionyloxy groups. The subscript n to R is 0, 1, 2 or 3.

Particular examples of the metal hydrogen complex compound represented by the general formula (I) include, though not limitative thereto, sodium borohydride $NaBH_4$, lithium aluminum hydride $LiAlH_4$, sodium boron trimethoxy hydride $NaBH(OCH_3)_3$, sodium boron triacetoxy hydride $NaBH(OCOCH_3)_3$, sodium boron triphenoxy hydride $NaBH(OC_6H_5)_3$, lithium aluminum trimethoxy hydride $LiAlH(OCH_3)_3$, lithium aluminum ethoxy hydride $LiAlH_3(OC_2H_5)$, lithium aluminum tri(tert-butoxy) hydride $LiAlH(tert-C_4H_9O)_3$ and sodium aluminum di(2-methoxyethoxy) hydride $NaAlH_2(OCH_2OC_2H_5)_2$. Particular examples of the metal hydrogen complex compound represented by the general formula (II) include, though not limitative thereto, zinc borohydride $Zn(BH_4)_2$, calcium borohydride $Ca(BH_4)_2$, zinc boron tetramethoxy hydride $Zn[B(OCH_3)_2H_2]_2$ and calcium boron hexaethoxy hydride $Ca[B(OC_2H_5)_3H]_2$. These metal hydrogen complex compounds can be used either singly or as a combination of two kinds or more. Each of these complex compounds is a known compound and available on the market as a selective hydrogenation agent.

As a general trend, the metal hydrogen complex compounds of the general formula (I) or (II), in which the subscript n is not zero, have low reactivity as compared with the compounds of which the subscript n is 0. Accordingly, the R-substituted complex compounds are useful as a reaction moderator when a moderately decreased rate of hydrogen gas generation is desired.

The hydrogen-generating reactions of these metal hydrogen complex compounds of the general formulas (I) and (II) with water are expressed by the following reaction equations:

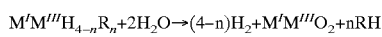

and

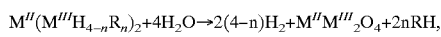

respectively, in which each symbol has the same meaning as defined above.

As is understood from the above given reaction equations, the hydrogen gas generated by the reaction is a combination of the hydrogen atoms partly provided by the decomposition of the metal hydrogen complex compound and partly provided from the water molecules so that a quite high efficiency can be obtained for the hydrogen gas generation. For example, a hydrogen gas yield of as high as 10.9% by weight can be obtained by using sodium borohydride as the metal hydrogen complex compound.

In step (a) of the inventive method for hydrogen gas generation, the metal hydrogen complex compound is dissolved in an aqueous alkaline medium to give a solution as the reaction medium. The solvent from which the aqueous alkaline medium is prepared by dissolving an alkaline compound is preferably water but water can be mixed with various water-miscible organic solvents including alcohols such as methyl and ethyl alcohols, dimethylformamide, dimethylacetamide, ethyleneglycol, diethyleneglycol and the like. It is important that these solvents never adversely affect the stability of the metal hydrogen complex compound dissolved in the alkaline medium.

The above mentioned solvents are rendered alkaline to give an aqueous alkaline medium by dissolving, in the solvent, an alkaline compound including alkali metal hydroxides such as lithium hydroxide, sodium hydroxide and potassium hydroxide and tetraalkylammonium hydroxides such as tetramethylammonium hydroxide and tetraethylammonium hydroxide. The aqueous alkaline medium should contain at least 5% by weight or, preferably, at least 10% by weight of the alkaline compound dissolved therein. While no upper limit is defined for the concentration of the alkaline compound up to the saturation concentration, it is preferable that the concentration does not exceed 30% by weight because, when the concentration is too high, the solubility of the metal hydrogen complex compound in the aqueous alkaline medium is decreased. For example, good solubility of the metal hydrogen complex compound is obtained in the alkaline medium containing from 8 to 30% by weight of sodium hydroxide or from 10 to 25% by weight of potassium hydroxide in which the metal hydrogen complex compound can be dissolved with stability not to be decomposed.

The reaction medium thus prepared by dissolving the metal hydrogen complex compound in an aqueous alkaline medium should contain the metal hydrogen complex compound in a concentration as high as possible up to saturation in view of the volume efficiency of the reaction medium for the generation of a unit volume of hydrogen gas. The possible highest concentration of the metal hydrogen complex compound in the reaction medium largely depends on the temperature of the medium. When the temperature of the reaction medium containing the metal hydrogen complex compound in the saturation concentration is decreased, the complex compound is naturally precipitated out in a crystalline form so that the reaction medium is no longer a uniform solution but no particular disadvantages are caused with such a non-uniform reaction medium containing precipitates of the complex compound.

Since the metal hydrogen complex compound contained in the reaction medium remains stable without decomposition according to the reaction equation (I) or (II) given above, it is essential in the inventive method that the reaction is promoted catalytically by a catalyst material brought into contact with the reaction medium. A catalyst material unexpectedly discovered by the inventor is a specific metal having catalytic activity or a so-called hydrogen-absorbing alloy which is a specific alloy such as $Mg_2Ni$ having capacity to absorb a large volume of hydrogen gas.

The above mentioned metal having catalytic activity is selected from the group consisting of nickel, cobalt, zirconium, rhodium, platinum, palladium, silver and gold which can be used either singly or as a combination of two kinds or more. The hydrogen-absorbing alloy useful in the present invention is exemplified by the $AB_2$-type alloys of the Laves structure including $Mg_2Ni$-based alloys such as the $Mg_2Ni$ alloy and eutectic alloy of $Mg_2Ni$ and Mg, $ZrNi_2$-based alloys and $TiNi_2$-based alloys, AB-type alloys such as TiFe-based alloys, $AB_5$-type alloys such as $LaNi_5$-based alloys and b.c.c. alloys such as $TiV_2$-based alloys. These metals and alloys can be used either singly or as a combination of two kinds or more.

The activity of the above described metals and/or alloys to serve as a catalyst for promotion of the decomposition reaction of the metal hydrogen complex compound dissolved in an aqueous alkaline medium can be greatly improved by fluorinating the metal or alloy. This fluorinating treatment can be performed by dipping a powder of the metal or alloy in an aqueous solution of a fluorinating agent to form a fluorinated surface layer of the particles. The aqueous solution of a fluorinating agent can be prepared, for example, by dissolving a water-soluble fluoride compound in a concentration of 0.2 to 20% by weight to give an aqueous solution which is then acidified by the addition of hydrofluoric acid to bring the pH value of the solution to the range from 2.0 to 6.5 or, preferably, from 4.5 to 6.0. The water-soluble fluoride includes alkali metal fluorides, such as sodium fluoride and potassium fluoride, and ammonium fluoride either alone or as a combination of two kinds or more, of which potassium fluoride having high solubility in water is preferable.

A preferable concentration of the water-soluble fluoride salt in the aqueous fluorinating solution is in the ranges from 0.3 to 3% by weight for sodium fluoride, from 0.5 to 5% by weight for potassium fluoride and from 0.5 to 8% by weight for ammonium fluoride. When the concentration of the fluoride is too low, an unduly long time is taken for the formation of a fluorinated surface layer on the particles of the metal or alloy while, when the concentration is too high, the fluorinating reaction is limited to the very surface of the particles not to give a fluorinated surface layer having a sufficiently large thickness.

When the pH value of the aqueous fluorinating solution is too low, the fluorinating reaction on the surface of the metallic particles proceeds so rapidly that the fluorinated surface layer would have decreased uniformity while, when the pH value is too high, the fluorinating reaction is unduly retarded not to give a fluorinated surface layer of an appropriate thickness within a practical limit of time. The amount of hydrogen fluoride added to the aqueous solution of the water-soluble fluoride salt for pH control depends on the kind of the fluoride salt and is preferably in the range from 1 to 3 moles per mole of sodium fluoride, from 0.2 to 3 moles per mole of potassium fluoride and from 0.2 to 1 mole per mole of ammonium fluoride.

The fluorination treatment of the metal or alloy is conducted by dipping the particles thereof in the above described aqueous fluorinating solution at a temperature in the range from 0 to 80° C. or, preferably, from 30 to 60° C. for a length of time in the range from 1 to 60 minutes so that the fluorinated surface layer on the particles has a thickness of 0.01 to 1 $\mu$m which is sufficiently large for the catalytic purpose.

The fluorinated or unfluorinated metal or alloy having catalytic activity for the decomposition reaction of the metal hydrogen complex compound can be used in the form of a fine powder. It is optional that the powder is consolidated into the form of a porous or non-porous plate or rod or granules, if convenient for being brought into contact with the reaction medium.

The manner by which the reaction medium containing the metal hydrogen complex compound dissolved therein is brought into contact with the above described metal or alloy is not particularly limitative. For example, a powder of the metal or alloy is gradually or portion-wise introduced into the reaction medium under agitation. Alternatively, the liquid reaction medium is passed through a column filled with granules or pellets of the metal or alloy forming a fixed bed at a controlled rate.

When hydrogen gas is generated by adding a powder of the metal or alloy into the reaction medium, the factors for controlling the rate of hydrogen gas generation include the concentration of the metal hydrogen complex compound in the reaction medium, specific surface area of the metal or alloy powder and rate of addition of the powder to the reaction medium, if not to mention the reaction temperature and other conventional factors in chemical processes in general.

When the latter method of using a fixed bed of the metal or alloy is undertaken, the determinant factors for the rate of hydrogen gas generation include the concentration of the metal hydrogen complex compound and flow rate of the reaction medium through the column. If decomposition of the metal hydrogen complex compound proceeds only partially by a single pass of the reaction medium through the catalyst bed in a column, it is optional that the partially depleted reaction medium is recycled to the same column or introduced into a second and further columns until complete depletion of the complex compound.

The hydrogen gas generated by the above described inventive method can be used in any applications without particular limitations either as generated or after storage in a vessel containing a hydrogen-absorbing alloy which is capable of absorbing a large volume of hydrogen gas. Hydrogen-absorbing alloys are also useful for the purpose of controlling the pressure of hydrogen gas in a closed vessel by utilizing the temperature-equilibrium pressure relationship.

In the following, the present invention is described in more detail by way of Examples.

Reference Example 1

Each a 100 ml volume of eight aqueous solutions of sodium hydroxide and eight aqueous solutions of potassium hydroxide in concentrations of 2, 4, 6, 8, 10, 15, 20 and 30% by weight was kept at a temperature of 23.5° C. and a 10 g portion of sodium borohydride $NaBH_4$ was added thereto portion-wise to be dissolved therein. The thus prepared aqueous solutions were visually examined for the evolution of hydrogen gas to find that absolutely no hydrogen gas was generated in the aqueous solutions when the concentration of sodium hydroxide was 8% by weight or higher and the concentration of potassium hydroxide was 10% by weight or higher indicating good stability of the hydride compound. On the other hand, vigorous evolution of hydrogen gas was noted in the 2% by weight sodium hydroxide solution while hydrogen gas was generated only little by little in the 2% and 4% by weight potassium hydroxide solutions.

Reference Example 2

The aqueous solutions prepared in Reference Example 1 by dissolving 10 g of sodium borohydride in 100 ml of aqueous solutions of sodium hydroxide and potassium hydroxide each in a concentration of 10% by weight were kept in a hermetically sealed vessel at 23.5° C. with periodical vigorous shaking up and down after 7, 14, 21 and 28 days of standing and were visually examined after 35 days for the generation of hydrogen gas to detect absolutely no generation of hydrogen gas indicating high stability of the hydride compound in a strongly alkaline aqueous solution.

Example 1

A varied amount of a nickel powder having an average particle diameter of 5 $\mu$m was taken in a round-bottom flask of 100 ml capacity, into which a 20 ml portion of an aqueous solution at 23.6° C. prepared by dissolving 10 g of sodium borohydride in 100 ml of a 10% by weight aqueous solution of sodium hydroxide as a reaction medium was added dropwise so that evolution of hydrogen gas proceeded from the reaction mixture.

FIG. 1 of the accompanying drawing shows the volume of hydrogen gas thus generated as a function of the time after addition of the reaction medium to the flask by the curves I, II and III corresponding to the amount of the nickel powder of 1.0 g, 0.5 g and 0.25 g, respectively. As is understood from this graph, the rate of hydrogen gas generation is largely dependent on the amount of the nickel powder added as the catalyst.

Example 2

The experimental procedure was substantially the same as in Example 1 except that, in place of the nickel powder, a fluorinated nickel powder was employed in varied amounts of 1.0 g, 0.75 g, 0.5 g and 0.25 g.

The fluorinated nickel powder employed here was prepared in the following manner. Thus, a 3 g portion of a nickel powder having an average particle diameter of 5 $\mu$m was added to 20 ml of a fluorinating solution prepared by dissolving potassium fluoride in a 46% aqueous solution of hydrogen fluoride in a molar ratio HF:KF of 1:10 and kept therein at 25° C. for 30 minutes under agitation followed by filtration, washing with water and drying.

Figure 2:
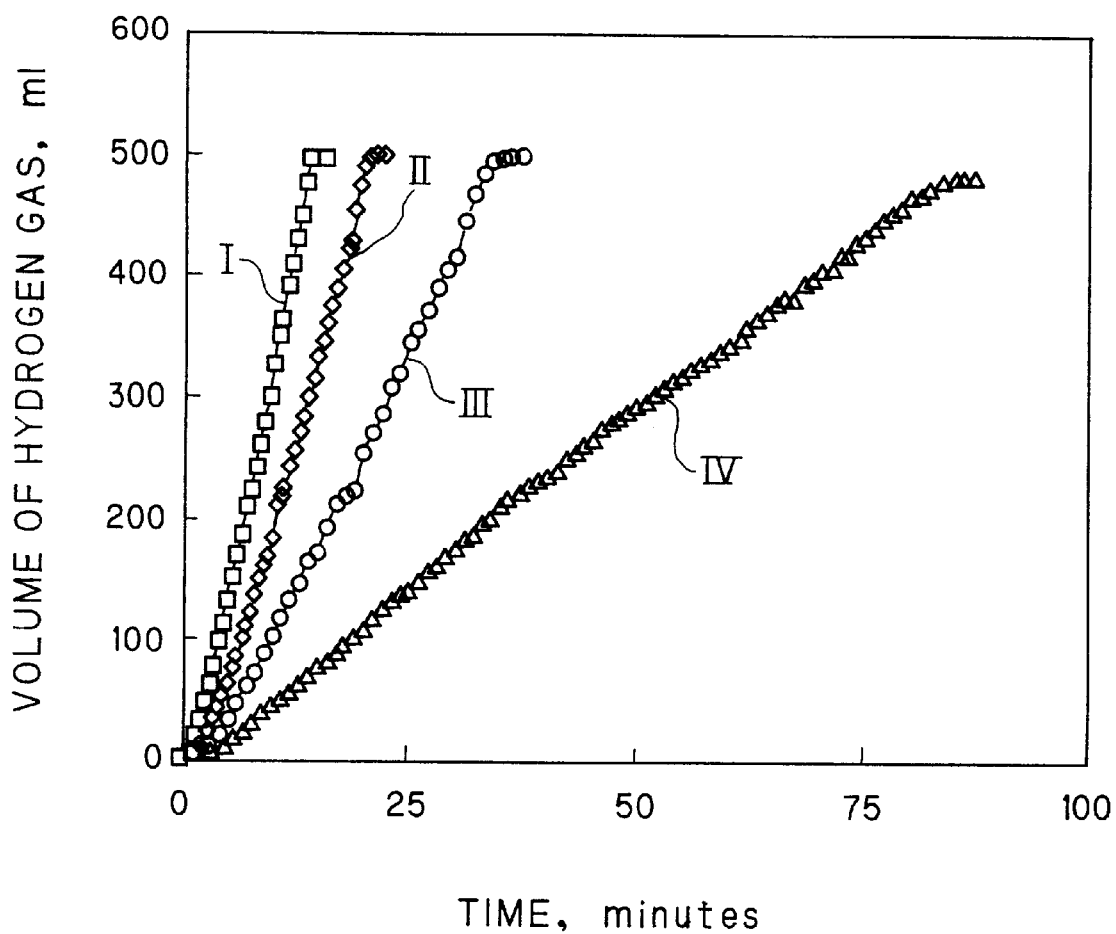

FIG. 2 shows the results of the volume measurements of the thus generated hydrogen gas as a function of time by the curves I, II, III and IV corresponding to the amounts of the fluorinated nickel powder of 1.0 g, 0.75 g, 0.5 g and 0.25 g, respectively. This graph also indicates the great influence of the amount of the fluorinated nickel powder as the catalyst on the rate of hydrogen gas generation.

Example 3

The experimental procedure was substantially the same as in Example 1 except that, in place of the nickel powder, powders of a hydrogen-absorbing alloy of the composition $Mg_2Ni$ before and after a fluorinating treatment were employed as the catalyst each in an amount of 1.0 g. The fluorinating treatment of the alloy powder was conducted in the following manner.

Thus, a 2 g portion of the alloy powder having an average particle diameter of 25 μm obtained by mechanical grinding was added to 20 ml of a fluorinating solution prepared by dissolving potassium fluoride in a 46% aqueous solution of hydrogen fluoride in a molar ratio HF:KF of 1:10 and kept therein at 25° C. for 30 minutes under agitation followed by filtration, washing with water and drying.

Each of the unfluorinated and fluorinated alloy powders was employed after a pulverization treatment by 5 times repeating the cycle of hydrogenation and dehydrogenation at 300° C. under a hydrogen pressure of 30 atmospheres and under vaccumization, respectively, and had an average particle diameter of 25 μm or smaller.

Figure 3:
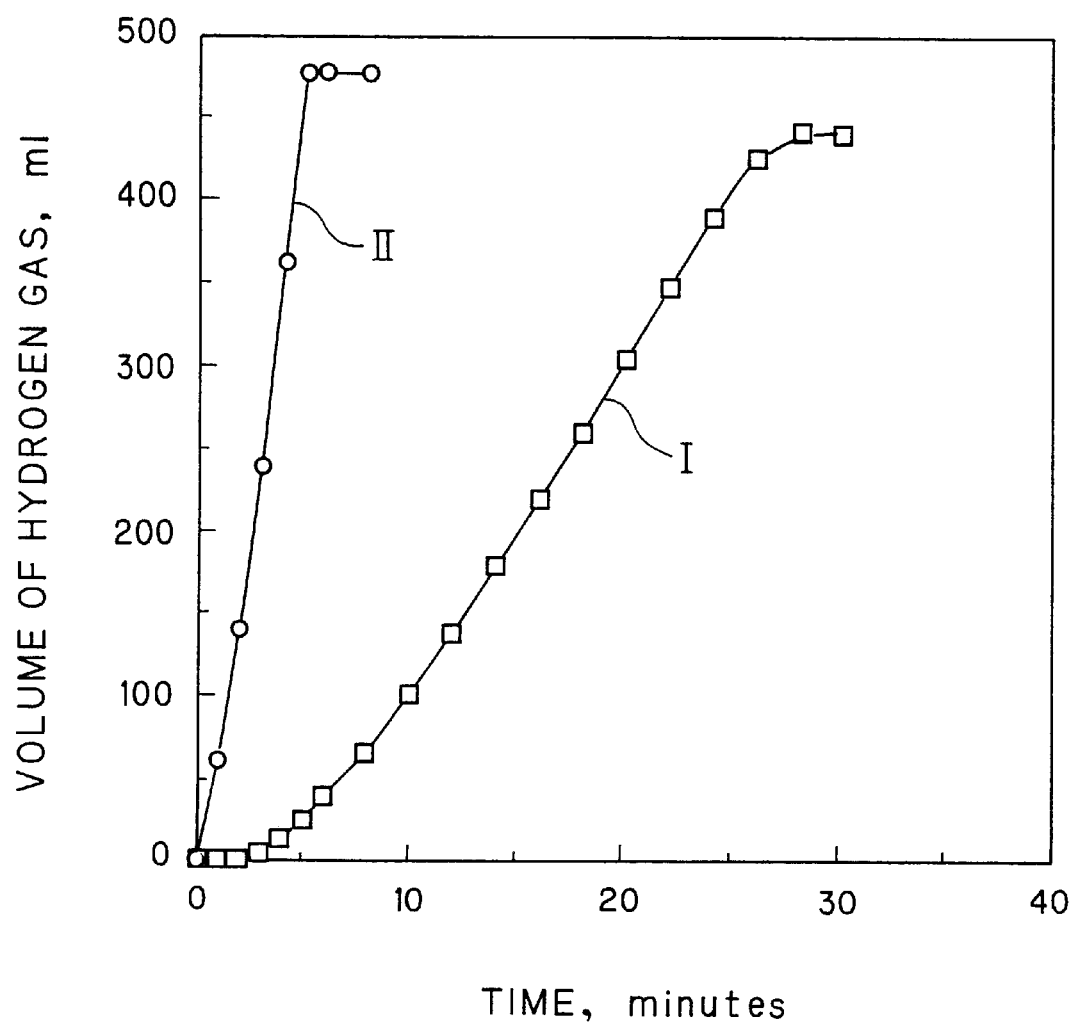

FIG. 3 shows the results of the volume measurements of the thus generated hydrogen gas as a function of time by the curves I and II corresponding to the unfluorinated and fluorinated alloy powders, respectively. This graph indicates that the rate of hydrogen gas generation can be increased by almost 7 times when the catalyst is the fluorinated $Mg_2Ni$ alloy powder as compared with the unfluorinated alloy powder.

Example 4

A fluorination treatment was undertaken as described below for the powders of eight kinds of metals and $Mg_2Ni$ alloy, of which the average particle diameters were not exceeding 74 μm, not exceeding 74 μm, about 149 μm, not exceeding 74 μm, 1 to 2 μm, not exceeding 5 μm and not exceeding 120 μm for the powders of copper, manganese, magnesium, iron, cobalt, zinc and titanium, respectively, and the specific surface areas were 2.45 m²/g, 1.03 m²/g, 0.46 m²/g, 0.96 m²/g, 4.22 m²/g, 1.14 m²/g, 0.19 m²/g, 2.65 m²/g and 6.50 m²/g for the powders of copper, manganese, magnesium, iron, cobalt, zinc, titanium, nickel and the alloy, respectively.

Thus, a 5 g portion of each of the powders was added to 100 ml of a fluorinating solution which was an aqueous solution containing 6 g/liter of potassium fluoride and 0.6 ml/liter of 46% hydrofluoric acid and kept therein under agitation at 35° C. for 45 minutes followed by filtration, washing with water and drying.

In the next place, a reaction medium was prepared by dissolving 1 g of a sodium borohydride powder $NaBH_4$ in 100 ml of a 10% by weight aqueous solution of sodium hydroxide and the reaction medium at 23.6° C. was admixed with one of the above prepared metal and alloy powders after the fluorinating treatment in such an amount as to give a surface area of 1.91 m². The condition of hydrogen gas evolution was visually examined immediately after introduction of and after 5 minutes, 2 hours and 6 hours from introduction of the powder. The results were recorded and are shown in Table 1 in four ratings A to D according to the criteria of:

A for violent evolution;
B for somewhat dull evolution;
C for slow evolution; and
D for absence of evolution.

TABLE 1

| Catalyst, | Hydrogen gas evolution, time after addition of catalyst | | | |
| --- | --- | --- | --- | --- |
| fluorinated | Immediately | 5 minutes | 2 hours | 6 hours |
| Cu | D | C | B | C |
| Mn | D | D | D | D |
| Mg | D | C | C | D |
| Fe | D | D | D | D |
| Co | A | A | D | D |
| Zn | D | D | D | D |
| Ti | D | D | C | D |
| Ni | D | B | A | A |
| $Mg_2Ni$ | D | B | A | A |

Example 5

The experimental procedure was just the same as in Example 4 excepting for the replacement of the aqueous sodium hydroxide solution with an aqueous potassium hydroxide solution of the same concentration. The results of the visual inspection of hydrogen gas evolution are shown in Table 2.

TABLE 2

| Catalyst, | Hydrogen gas evolution, time after addition of catalyst | | | |
| --- | --- | --- | --- | --- |
| fluorinated | Immediately | 5 minutes | 2 hours | 6 hours |
| Cu | D | C | B | C |
| Mn | D | D | D | D |
| Mg | D | C | C | D |
| Fe | D | D | D | D |
| Co | A | A | C | D |
| Zn | C | C | C | C |
| Ti | D | D | D | D |
| NI | D | B | A | A |
| $Mg_2Ni$ | D | B | A | A |

Comparison of the results shown in Tables 1 and 2 indicates that:

the fluorinated cobalt powder exhibits high catalytic activity already just after addition to the reaction medium but loses the activity within several tens of minutes;

the fluorinated zinc powder exhibits low but lasting catalytic activity only in a medium of potassium hydroxide;

the fluorinated nickel and $Mg_2Ni$ alloy powders start to exhibit the catalytic activity at a moment after several minutes from addition and high activity lasts for longer than 6 hours in both of the sodium hydroxide and potassium hydroxide media; and fluorinated titanium, iron and manganese powders do not exhibit catalytic activity.

What is claimed is:

1. A method for generation of hydrogen gas which comprises the steps of:

(a) dissolving, in an aqueous alkaline solution, a metal hydrogen complex compound represented by the general formula

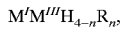

or

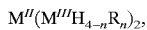

in which $M^I$ is an alkali metal, $M^{II}$ is an alkaline earth metal or zinc, $M^{III}$ is an element selected from the group consisting of boron, aluminum and gallium, R is an alkoxy group, aryloxy group or acyloxy group and the subscript n is 0, 1, 2 or 3, to form a solution as a reaction medium; and (b) bringing the reaction medium into contact with a fluorinated or unfluorinated metal or a hydrogen-absorbing alloy as a catalyst, the fluorinated or unfluorinated metal being selected from the group consisting of nickel, cobalt, zirconium, rhodium, platinum, palladium, silver and gold and the hydrogen-absorbing alloy being selected from the group consisting of Laves-phase $AB_2$ alloys, AB alloys and b.c.c. alloys.

2. The method for generation of hydrogen gas as claimed in claim 1 in which the subscript n in the general formulas representing the metal hydrogen complex compound is 0.

3. The method for generation of hydrogen gas as claimed in claim 1 in which the reaction medium is prepared by dissolving the metal hydrogen complex compound in an aqueous alkaline solution having a pH of 9 or higher.

4. The method for generation of hydrogen gas as claimed in claim 1 in which the concentration of the metal hydrogen complex compound in the reaction medium is in the range from 5 to 50% by weight.

5. The method for generation of hydrogen gas as claimed in claim 1 in which the aqueous alkaline solution is an aqueous solution of an alkali metal hydroxide selected from the group consisting of lithium hydroxide, sodium hydroxide and potassium hydroxide.

6. The method for generation of hydrogen gas as claimed in claim 5 in which the concentration of the alkali metal hydroxide in the aqueous alkaline solution is in the range from 5 to 30% by weight.

7. The method for generation of hydrogen gas as claimed in claim 5 in which step (b) is conducted by adding the catalyst to the reaction medium or by passing the reaction medium through a fixed bed of the catalyst.

8. The method for generation of hydrogen gas as claimed in claim 1 in which the fluorinated or unfluorinated metal as the catalyst in step (b) is nickel.

9. The method for generation of hydrogen gas as claimed in claim 1 in which the hydrogen-absorbing alloy as the catalyst in step (b) is $Mg_2Ni$ alloy.

10. The method for generation of hydrogen gas as claimed in claim 1 in which the catalyst in step (b) is a powder of the fluorinated or unfluorinated metal or hydrogen-absorbing alloy consisting of particles having a fluorinated surface.

* * * * *